United States Patent Office 2,717,887
Patented Sept. 13, 1955

2,717,887

SALTS OF VINYLPYRIDINE POLYMERS WITH ANIONIC SOAP-FORMING SULFURIC AND SULFONIC ACIDS OF HIGH MOLECULAR WEIGHT

William Russell Saner, Plainfield, N. J., assignor to E. I. du Pont de Nemours and Company, Wilmington, Del., a corporation of Delaware No Drawing. Application December 2, 1952,
Serial No. 323,716

10 Claims. (Cl. 260—79.3)

This invention relates to salts of vinylpyridine polymers. More particularly, it relates to salts of vinylpyridine polymers with anionic soap-forming acids. Still more particularly it relates to polymeric salts of vinylpyridine polymers with aliphatic sulfuric and sulfonic acids and alkyl-substituted aromatic sulfonic acids of high molecular weight. The invention further relates to processes for preparing such salts.

An object of this invention is to provide a new class of polymeric compounds. A more specific object is to provide new polymeric salts. A still more specific object is to provide new polymeric salts of vinylpyridine polymers with anionic soap-forming acids. Still other objects will be apparent from the following description of the invention.

It has been discovered that vinylpyridine polymers, e. g., poly-2-vinylpyridine, form polymeric addition salts with anionic, soap-forming, sulfur-containing organic acids of high molecular weight, e. g., containing 10 to 24 carbon atoms, including alkyl-substituted aromatic mono- and poly-sulfonic acids of high molecular weight and aliphatic, monosulfonic and monosulfuric acids of high molecular weight. The polymeric salts are film-forming and have numerous uses. The hydrocarbon, sulfonic and sulfuric acids referred to above apparently react with the recurring trivalent nitrogen atoms of the vinylpyridine polymers and form polymeric pentavalent nitrogen addition salts. They form hard, smooth layers which are resin-like in appearance and are insoluble in water and dilute aqueous alkaline solutions such as alkaline photographic developer solutions.

The alkyl-substituted aromatic sulfonic acids and the aliphatic sulfonic and sulfuric acids which may be used in accordance with the invention to form the polymeric pentavalent addition salts include the alkane sulfonic acids of 10 to 18 or more carbon atoms, the monoalkyl sulfates of 10 to 18 or more carbon atoms and the alkylated benzene and naphthalene sulfonic acids having at least 10 carbon atoms wherein the alkyl groups contain 3 to 12 carbon atoms and 1 to 3 groups are present in the aromatic nucleus.

The polymeric salts of the vinylpyridine polymers with the hydrocarbon sulfonic and sulfuric acids described above may be readily prepared by admixing the vinylpyridine polymers with one or a mixture of 2, 3, 4 or more of the free, high molecular weight acids just described, in an aqueous medium or solution. It is not necessary, however, to add the sulfonic or sulfuric acid to the aqueous medium in the form of the free acid. To the contrary, the alkali metal, ammonium or amine salts can be added to the solution and it made acid, if necessary, by the addition of a highly ionizable or strong organic or inorganic acid, e. g., hydrochloric, sulfuric or acetic acid. The acid concentration should be weak but sufficient to assure or initiate the presence of the free organic sulfonic or sulfuric acids. The polymeric vinylpyridine addition salts of the anionic, soap-forming, sulfur-containing acids of high molecular weight precipitate out during the course of the reaction. They can be purified by a washing in water and recrystallization from solution in an organic solvent, e. g., methanol, ethanol, etc.

The vinylpyridine polymers used as initial reactants can be made by polymerizing a monomeric vinylpyridine of relatively low molecular weight, e. g., alpha-, beta- or gamma-vinylpyridine, or a homologue thereof containing an alkyl radical of 1 to 4 carbon atoms on the pyridine ring, in a liquid medium by the aid of a vinyl compound polymerization catalyst. An organic solvent solution can be used as the liquid medium, if desired. However, the organic solvent should be inert so that it will not interfere with the polymerization reaction. The polymers can be made by emulsion polymerization, if desired, and bulk polymerization methods are effective. The polymerization is preferably carried out in an aqueous acid solution or medium in the presence of a peroxy compound catalyst at temperatures from about 20 to 50° C. for a period of 10 or less to 200 or more hours. The proportion of acid, e. g., hydrochloric or sulfuric acid, used may vary over a fairly wide range, e. g., from 0.5 to 2.5 moles of acid per mole of vinylpyridine monomer.

The resulting solution may be diluted with water and admixed with a basic solution, e. g., aqueous sodium hydroxide, whereupon a vinylpyridine polymer precipitates and can be washed and dried. In some cases, it is desirable to incorporate a neutralizing agent in the washing solutions to remove any remaining acid catalyst.

The vinylpyridine polymers described above, including the lower alkyl substituted polyvinylpyridines, are of relatively high molecular weight and form clear, hard, resinous films. They are soluble in 1% aqueous acetic acid and other acids, e. g., hydrochloric, sulfamic, sulfuric, and oxalic acids.

The polymers in question need not consist wholly of a single polymerized monomer. To the contrary, a mixture of two or more monomeric vinylpyridines as described above can be used. In addition, copolymers which contain up to 20% of another polymerizable vinyl or vinylidene compound

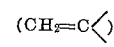

are useful. The latter compounds may be admixed with the monomeric vinylpyridine, and the polymerization carried out in a similar manner. The copolymers should likewise be soluble in 1% aqueous acetic acid. Suitable compounds for copolymerization include styrene, acrylic acid esters and amides, alpha-alkyl-substituted acrylic esters and amides, and acrylonitrile and methacrylonitrile. Among the specific useful compounds of this type are methyl and ethyl acrylates and methacrylates; methacrylamide and n-methylacrylamide; acrylonitrile and methacrylonitrile. Mixtures of two or more of the polymerizable vinyl or vinylidene compounds can be used, if desired.

The proportion of the hydrocarbon sulfuric or sulfonic acid or alkali metal or ammonium salt used to make the polymeric addition salt may vary widely, e. g., from 0.01 to 0.5 mole of the former acid per mole of vinylpyridine monomer. Preferred amounts of the former range from 0.05 to 0.1 mole for each mole of vinylpyridine monomer.

The invention will be further illustrated but is not intended to be limited by the following examples.

Example I

A solution of 3.5 grams of sodium isopropyl β-naphthalene sulfonate in 300 milliliters of water was added with stirring to 120 milliliters of a 10% solution in methanol of poly-2-vinylpyridine containing 2 milliliters of glacial acetic acid per 22 milliliters of solution. The pH of the solution was slightly acid and a polymeric addition salt of the anionic surface active-wetting agent with the poly-2-vinylpyridine was precipitated. The poly-2-vinylpyridine was soluble in 1% acetic acid, insoluble in water and alkaline photographic developer solutions and formed clear, hard resin-like films. The polymeric addition salt which precipitated was soluble in methanol and ethanol. When the salt was coated from ethanol or methanol solution on a support, a transparent, hard, resin-like film was formed.

*Example II*

Another poly-2-vinylpyridine addition salt was made after the manner described in Example I by substituting an equivalent amount of a mixture of sodium alkyl sulfates of 10 to 18 carbon atoms, predominating in sodium alkyl sulfates of 12 carbon atoms, for the sodium isopropyl β-naphthalene sulfonate described in the preceding example. The reactant solution also had a pH on the acid side. The poly-2-vinylpyridine addition salt of the alkyl sulfates had properties similar to the addition salts of Example I.

*Example III*

Another poly-2-vinylpyridine addition salt was made after the manner described in Example I, by substituting a higher fatty acid amide of an amino ethane sulfonic acid, e. g., $C_{17}H_{33}CONHCH_2CH_2SONa$ for the sodium isopropyl β-naphthalene sulfonate described in Example I. The reactant solution had a pH on the acid side. The polymeric addition salt of the amido ethane sulfonic acid had properties similar to the addition salts of Example I.

*Example IV*

To a solution of three grams of poly-2-vinylpyridine in 200 milliliters of 2% aqueous acetic acid there was added slowly a solution of 3 grams of a mixture of sodium alkyl sulfates of 10 to 18 carbon atoms predominating in sodium alkyl sulfates of 12 carbon atoms dissolved in 200 milliliters of water. The solution had a pH on the acid side. The polymeric addition salt began to precipitate after a small portion of the sodium alkyl sulfate solution was added. After complete mixing, the supernatant liquid was decanted, the precipitate of poly-2-vinylpyridine addition salt washed in water, dissolved in methanol and re-precipitated with an excess of water. The polymeric addition salt was soluble in methanol, ethanol and mixtures of these alcohols with acetone. Applied to nitrocellulose film base from a mixture of methanol and ethanol a clear coating was obtained with good adhesion to the nitrocellulose.

*Example V*

A solution of 0.35 gram of a mixture of sodium alkyl sulfates of 10 to 18 carbon atoms, predominating in sodium alkyl sulfates of 12 carbon atoms in 30 milliliters of water was added with stirring to 12 milliliters of a 10% solution of poly-4-vinylpyridine (which polymer was soluble in 1% aqueous acetic acid and formed a clear, hard, resin-like film) in methanol containing 1 milliliter of glacial acetic acid so that free alkyl sulfates of 10–18 carbon atoms were present, whereby a polymeric salt of the alkyl sulfates with the poly-4-vinylpyridine was precipitated. The polymeric addition salt was isolated and found to be soluble in methanol and ethanol. When the salt was coated from ethanol or methanol solution on a support, a transparent, hard, resin-like film was formed.

In place of the specific hydrocarbon sulfonic and sulfuric acid sodium salts described in the foregoing examples there may be substituted a large number of other specific compounds of this type including the corresponding free acids, other alkali metal salts, ammonium or water-soluble amine salts, or mixtures of such compounds, with similar results. Suitable compounds include normal decyl, nonyl, dodecyl, tetradecyl, hexadecyl, heptadecyl and octadecyl sulfonic acid and hydrogen sulfates and their corresponding sodium, potassium, ammonium, ethanolamine, diethanolamine, triethanolamine, trimethylamine, and cyclohexylamine salts. Still other useful compounds include 2-methyl dodecyl sulfate, oleyl hydrogen sulfate, hexylphenyl sulfonic acid, decylphenyl sulfonic acid, dodecylphenyl sulfonic acid, dipentylphenyl sulfonic acid; di-isopropyl and tri-isopropyl naphthalene mono- and di-sulfonic acid, dimethyl naphthalene sulfonic acid, triethyl naphthalene sulfonic acid, n-hexyl naphthalene sulfonic acid, n-dodecyl naphthalene sulfonic acid, etc., and their water-soluble sodium, potassium, ammonium, ethanolamine, diethanolamine, triethanolamine, trimethylamine, and cyclohexylamine salts. In the latter compounds the sulfonic acid group is generally in the α or β position of one ring and the alkyl group in such positions of the other ring.

The preferred polymeric salts are those obtained from poly-2-vinylpyridine or poly-4-vinylpyridine and normal alkyl hydrogen sulfates of 10 to 18 carbon atoms.

The polymeric salts of the vinylpyridine polymers of this invention as stated above have numerous technical uses. They are useful as components of various layers in photographic elements such as non-halation layers, anti-static layers, emulsion layers, sublayers, etc., a number of such uses being described in assignee's copending application Ser. No. 104,820, filed July 14, 1949 now abandoned, of which this application is a continuation-in-part.

This invention has the advantage that it provides a new and useful class of organic compounds. It provides a simple and practical method for obtaining new polymeric salts which have utility in coating compositions, etc. The new salts are useful as chemical intermediates in producing resins, plastics, etc.

This application is a continuation-in-part of my co-pending application Ser. No. 142,075, filed February 2, 1950 now abandoned.

As many widely different embodiments of this invention can be made without departing from the spirit and scope thereof, it is to be understood that the invention is not to be limited except as defined by the claims.

What is claimed is:

1. A polymeric salt of a polymer taken from the group consisting of polymers of alpha-, beta-, and gamma-vinylpyridine and their homologues which contain an alkyl radical of 1 to 4 carbon atoms on the pyridine ring, with an acid taken from the group consisting of alkane monosulfonic acids of 10 to 18 carbon atoms, alkane monosulfuric acids of 10 to 18 carbon atoms, alkyl naphthalene mono- and di-sulfonic acids having 1–12 carbon atoms in the alkyl group and higher fatty acid amides of aminoethane sulfonic acids, in which the recurring nitrogen atoms are joined to said acid by an addition bond.

2. A polymeric salt of a polymer taken from the group consisting of polymers of alpha-, beta-, and gamma-vinylpyridine and their homologues which contain an alkyl radical of 1 to 4 carbon atoms on the pyridine ring, with an alkane monosulfonic acid of 10 to 18 carbon atoms, in which the recurring nitrogen atoms are joined to said acid by an addition bond.

3. A polymeric salt of a polymer taken from the group consisting of polymers of alpha-, beta-, and gamma-vinylpyridine and their homologues which contain an alkyl radical of 1 to 4 carbon atoms on the pyridine ring, with a monoalkyl sulfate of 10 to 18 carbon atoms, in which the recurring nitrogen atoms are joined to said alkyl sulfate by an addition bond.

4. A polymeric salt of a polymer taken from the group consisting of polymers of alpha-, beta-, and gamma-vinylpyridine and their homologues which contain an alkyl radical of 1 to 4 carbon atoms on the pyridine ring, with an alkylnaphthalene monosulfonic acid containing 1 to 12 carbon atoms in the alkyl group, in which the recurring nitrogen atoms are joined to said acid by an addition bond.

5. A polymeric salt of a poly-2-vinylpyridine polymer with an alkane monosulfonic acid of 10 to 18 carbon atoms, in which the recurring nitrogen atoms are joined to said acid by an addition bond.

6. A polymeric salt of a poly-2-vinylpyridine polymer with a monoalkyl sulfate of 10 to 18 carbon atoms, in which the recurring nitrogen atoms are joined to said alkyl sulfate by an addition bond.

7. A polymeric salt of a poly-2-vinylpyridine polymer with an alkylnaphthalene monosulfonic acid containing 1 to 12 carbon atoms in the alkyl group, in which the recurring nitrogen atoms are joined to said acid by an addition bond.

8. A polymeric salt of a poly-2-vinylpyridine polymer with a mixture of monoalkyl sulfates, the alkyl radicals containing from 10 to 18 carbon atoms, in which the recurring nitrogen atoms are joined to said alkyl sulfate by an addition bond.

9. A polymeric salt of poly-4-vinylpyridine polymer with a mixture of monoalkyl sulfates, the alkyl radicals containing from 10 to 18 carbon atoms, in which the recurring nitrogen atoms are joined to said alkyl sulfate by an addition bond.

10. A polymeric salt of a polymer taken from the group consisting of polymers of alpha-, beta-, and gamma-vinylpyridine and their homologues which contain an alkyl radical of 1 to 4 carbon atoms on the pyridine ring, with an isopropyl naphthalene monosulfonic acid, in which the recurring nitrogen atoms are joined to said acid by an addition bond.

References Cited in the file of this patent

UNITED STATES PATENTS 2,548,564   Sprague --------------- Apr. 10, 1951